US011327547B2

(12) United States Patent
G et al.

(10) Patent No.: US 11,327,547 B2
(45) Date of Patent: *May 10, 2022

(54) EXTENDING PROCESSOR PERFORMANCE

(71) Applicant: Intel Corporation, Santa Clara, CA (US)

(72) Inventors: Naveen G, Bangalore (IN); Bharath Kumar, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/068,704

(22) Filed: Oct. 12, 2020

(65) Prior Publication Data

US 2021/0026432 A1 Jan. 28, 2021

Related U.S. Application Data

(63) Continuation of application No. 16/269,551, filed on Feb. 6, 2019, now Pat. No. 10,802,565.

(51) Int. Cl.
*G06F 1/32* (2019.01)
*G06F 1/26* (2006.01)
*G06F 1/3206* (2019.01)

(52) U.S. Cl.
CPC ........... *G06F 1/3206* (2013.01); *G06F 1/266* (2013.01)

(58) Field of Classification Search
CPC .............................. G06F 1/3206; G06F 1/266
See application file for complete search history.

(56) References Cited

U.S. PATENT DOCUMENTS

| 6,256,180 B1 | 7/2001 | Voit |
| 6,574,577 B2 | 6/2003 | Stapleton et al. |
| 9,235,246 B2 | 1/2016 | Chen et al. |
| 9,411,398 B2 | 8/2016 | Ji et al. |
| 2015/0277535 A1 | 10/2015 | Uan-Zo-Li et al. |
| 2018/0278053 A1 | 9/2018 | Uan-Zo-Li et al. |

FOREIGN PATENT DOCUMENTS

WO 2018217508 11/2018

OTHER PUBLICATIONS

International Search Report and Written Opinion from PCT/US2020/012511 dated Jan. 7, 2020, 15 pgs.
Notice of Allowance from U.S. Appl. No. 16/269,551 dated Jun. 15, 2020, 12 pgs.

*Primary Examiner* — Stefan Stoynov
(74) *Attorney, Agent, or Firm* — Schwabe, Williamson & Wyatt, P.C.

(57) ABSTRACT

Technology for a system operable to extend a level of processor performance is disclosed. The system can comprise a power source connected to a platform voltage regulator (VR) and one or more processors and configured to provide an input power to the platform VR. The system can further comprise the platform VR connected to a peripheral interface and the one or more processors and configured to power the peripheral interface and send a power good signal to the one or more processors. The system can further comprise the peripheral interface connected to the platform VR and the one or more processors and configured to connect to a peripheral device and send a signal to the one or more processors when a peripheral interface connection state is identified as connected.

20 Claims, 12 Drawing Sheets

EXTENDING PROCESSOR PERFORMANCE

CLAIM OF PRIORITY

This application is a continuation of, and claims priority to, U.S. patent application Ser. No. 16/269,551, filed on Feb. 6, 2019, entitled "EXTENDING PROCESSOR PERFORMANCE," which is incorporated by reference in its entirety.

BACKGROUND

In a tablet, two-in-one device, or other user equipment (UE), the performance of the central processing unit (CPU) can decrease as the charge state of the battery decreases. This can be annoying or frustrating to users who want to enjoy high performance from a portable device when disconnected from a power outlet.

For example, CPU performance can be limited in a battery-powered system because the system can crash when the battery's state of charge (SOC) falls below a certain threshold. At a lower battery SOC, the voltage drop induced by high CPU performance can drop the system voltage below the minimum input voltage of the voltage regulator. In turn, the lack of adequate input voltage for the voltage regulator can crash the system.

BRIEF DESCRIPTION OF THE DRAWINGS

Features and advantages of technology embodiments will be apparent from the detailed description which follows, taken in conjunction with the accompanying drawings, which together illustrate, by way of example, various technology features; and, wherein.

Figure 1A:
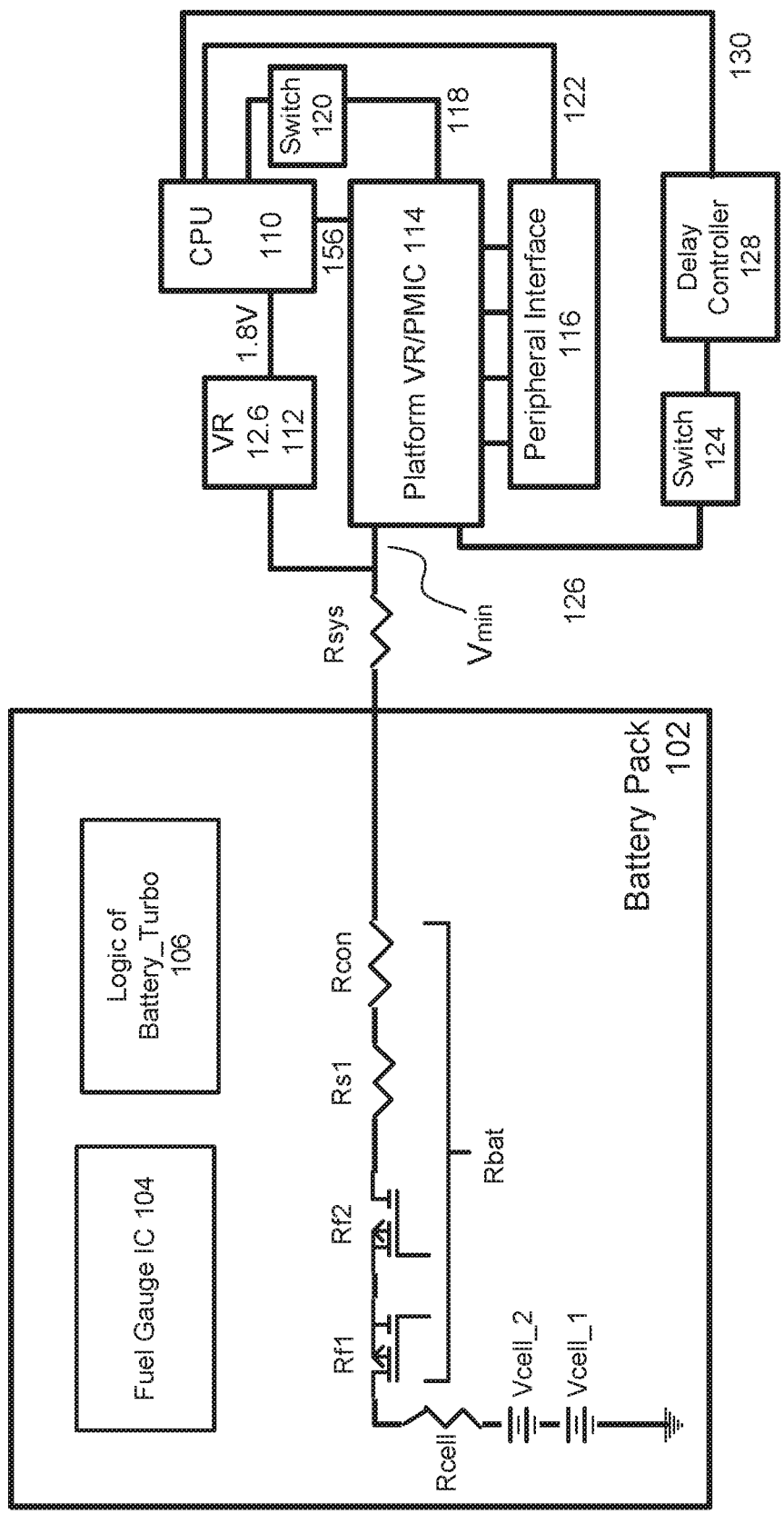
FIG. 1a illustrates a system for dynamic battery power in accordance with an example embodiment.

Reference will now be made to the exemplary embodiments illustrated, and specific language will be used herein to describe the same. It will nevertheless be understood that no limitation on technology scope is thereby intended.

DESCRIPTION OF EMBODIMENTS

Before the disclosed technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various invention embodiments. One skilled in the relevant art will recognize, however, that such detailed embodiments do not limit the overall technological concepts articulated herein, but are merely representative thereof.

As used in this written description, the singular forms "a," "an" and "the" include express support for plural referents unless the context clearly dictates otherwise. Thus, for example, reference to "port" includes a plurality of such ports.

Reference throughout this specification to "an example" means that a particular feature, structure, or characteristic described in connection with the example is included in at least one embodiment of the present invention. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "coupled" and "connected" can be used interchangeably and refer to a relationship between items or structures that are either directly or indirectly connected in an electrical or nonelectrical manner. "Directly coupled" or "directly connected" objects or elements are in physical contact with one another, or are otherwise connected without an intervening device or component therebetween. In this written description, recitation of "coupled" or "connected" provides express support for "directly coupled" or "directly connected" and vice versa. Objects described herein as being "adjacent to" each other may be in physical contact with each other, in close proximity to each other, or in the same general region or area as each other, as appropriate for the context in which the phrase is used.

Occurrences of the phrase "in one embodiment," or "in one aspect," herein do not necessarily all refer to the same embodiment or aspect.

As used herein, comparative terms such as "increased," "decreased," "better," "worse," "higher," "lower," "enhanced," "maximized," "minimized," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a sensor with "increased" sensitivity can refer to a sensor in a sensor array which has a lower level or threshold of detection than one or more other sensors in the array. A number of factors can cause such increased sensitivity, including materials, configurations, architecture, connections, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

In a tablet, smartphone, laptop computer, two-in-one device, or other user equipment (UE), the performance of the central processing unit (CPU) can decrease as the battery's state of charge decreases. This can be annoying or frustrating to users who want to enjoy high performance from a portable device when disconnected from a power outlet.

Many systems employ a platform voltage regulator (VR) (e.g., a 5 volt VR (5V VR)). However, in such systems, for example a 2-cell battery system, CPU performance can be limited because the system can crash when the battery's state of charge falls below a certain threshold. At a lower battery state of charge, the voltage drop arising from the use of high CPU performance can be sufficient to drop the output voltage from the battery below the minimum input voltage used for a platform VR.

In one example, dynamic battery power technology (DBPT) can be used to determine battery pack power capability through a fuel gauge. DBPT can also be used to determine acceptable power levels at which the platform VR can be operable without crashing the system. In such systems, as the battery state of charge decreases, CPU performance typically decreases. One proposed solution is a buck boost regulator; however, such regulators can be costly and can have a low efficiency.

In one example, a system can comprise a power source, a platform VR, a peripheral interface, a switch, or one or more processors. The power source can be connected to the platform VR and the one or more processors and configured to provide an input power to the platform VR. The platform VR can be connected to a peripheral interface and the one or more processors and configured to power the peripheral interface and send a power good signal to the one or more processors. The peripheral interface can be connected to the platform VR and the one or more processors and configured to connect to a peripheral device and send a signal to the one or more processors when a peripheral interface connection state is identified as connected. The switch can be configured to mask the power good signal when the peripheral interface connection state is identified as disconnected. The one or more processors can be configured to identify whether the peripheral interface connection state is connected or disconnected. The one or more processors can be configured to determine whether to extend a level of processor performance based on the peripheral interface connection state.

In one example, as illustrated in the circuit diagram in FIG. 1, a circuit can include a battery pack 102, a platform voltage regulator and/or power management integrated circuit (PMIC) 114, a peripheral interface 116, a voltage regulator 112, and one or more processors 110.

In one example, a battery pack 102 can comprise a first battery cell (e.g., $V_{cell\_1}$) and a second battery cell (e.g., $V_{cell\_2}$). The first battery cell and the second battery cell can be connected in series. The first battery cell and the second battery cell can include an impedance or resistance (e.g., $R_{cell}$). The battery pack 102 can further comprise one or more transistors with impedances or resistances (e.g., $R_{f1}$ and $R_{f2}$) and one or more impedances or resistances (e.g., $R_{s1}$ and $R_{con}$), which can be represented by an overall impedance or resistance (e.g., $R_{bat}$).

In one example, the system can include an impedance or resistance (e.g., $R_{sys}$) which can include the impedances or resistance between the output of the battery pack 102 and the input of the platform VR 114 of PMIC 114.

In one example, the battery pack can comprise a fuel gauge integrated circuit (IC) 104 and a logic of battery_turbo 106. The fuel gauge IC 104 can be configured to calculate the maximum power (e.g., Pmax_batt) that the battery pack can deliver to the system at any given time based on the constraints of the battery pack 102. The current from the battery pack (e.g., Ipack) can have a maximum value (Imax_pack). Therefore, the maximum power that the battery pack can deliver to the system at any given time can be based on the parameters: Rcell, Rbatt, Rsys, and Imax_pack, $V_{cell\_1}$, and $V_{cell\_2}$. In one example, the system voltage (Vsys) can be defined at the input of the platform voltage regulator (VR) 114 as Vsys=$V_{cell\_1}$+$V_{cell\_2}$−[Ipack*($R_{cell}$+$R_{bat}$+$R_{sys}$)]. In one example, when maximum current is drawn from the battery pack, then the system voltage can be at a minimum system voltage (e.g., Vmin). The fuel gauge IC 104 can calculate Pmax_batt, which can be communicated from the battery pack 102 to an embedded controller (EC) through a communication interface.

In one example, battery pack 102 can be connected to the platform voltage regulator 114 and the voltage regulator 112. In one example, the platform voltage regulator 114 can include a 5 volt voltage regulator (5V VR) or a 3.3 volt voltage regulator (3.3V VR). Each of the 5V VR and the 3.3V VR can be connected to a peripheral interface 116.

In one example, the voltage regulator 112 can include a 12.6 volt voltage regulator (12.6V VR). The 12.6V VR can be configured to send a 1.8 volt signal to one or more processors 110 (e.g., a central processing unit (CPU)). The CPU can be configured to operate on a variable power. In one example, the platform VR 114 (e.g., a 5V VR) can be configured to send a specified voltage (e.g., 5V) to the one or more processors 110 via a connection 156.

In one example, the platform voltage regulator and/or PMIC 114 can be connected to a peripheral interface 116. The peripheral interface 116 can include one or more of an audio amplifier port, a high-definition multimedia interface (HDMI) port, or a universal serial bus (USB) port. The peripheral interface can be configured to be connected to one or more of an audio amplifier device, a high-definition multimedia interface (HDMI) device, or a universal serial bus (USB) device. The peripheral interface 116 can be connected to a CPU 110 via a connection 122.

In one example, the platform VR and/or PMIC 114 can comprise a platform VR, a PMIC, or both a platform VR and a PMIC. The platform VR can comprise a 5 volt VR or a 3.3 volt VR, or a VR of any other voltage that can be configured to provide power to a peripheral interface 116.

In one example, the CPU 110 can be connected 130 to a delay controller 128 that can be connected to a switch 124 that can be connected to the platform VR and/or PMIC 114 via a connection 126. The delay controller 128 can be configured to activate switch 124, wherein the switch 124 can be configured to enable or disable the platform VR 114.

In one example, the platform VR and/or PMIC 114 can be connected to a switch 120 via a connection 118. The switch 120 can be configured to mask a power good signal from the platform VR to the CPU. The platform VR and/or PMIC 114 can be connected to the CPU via the connection 156.

Figure 1B:
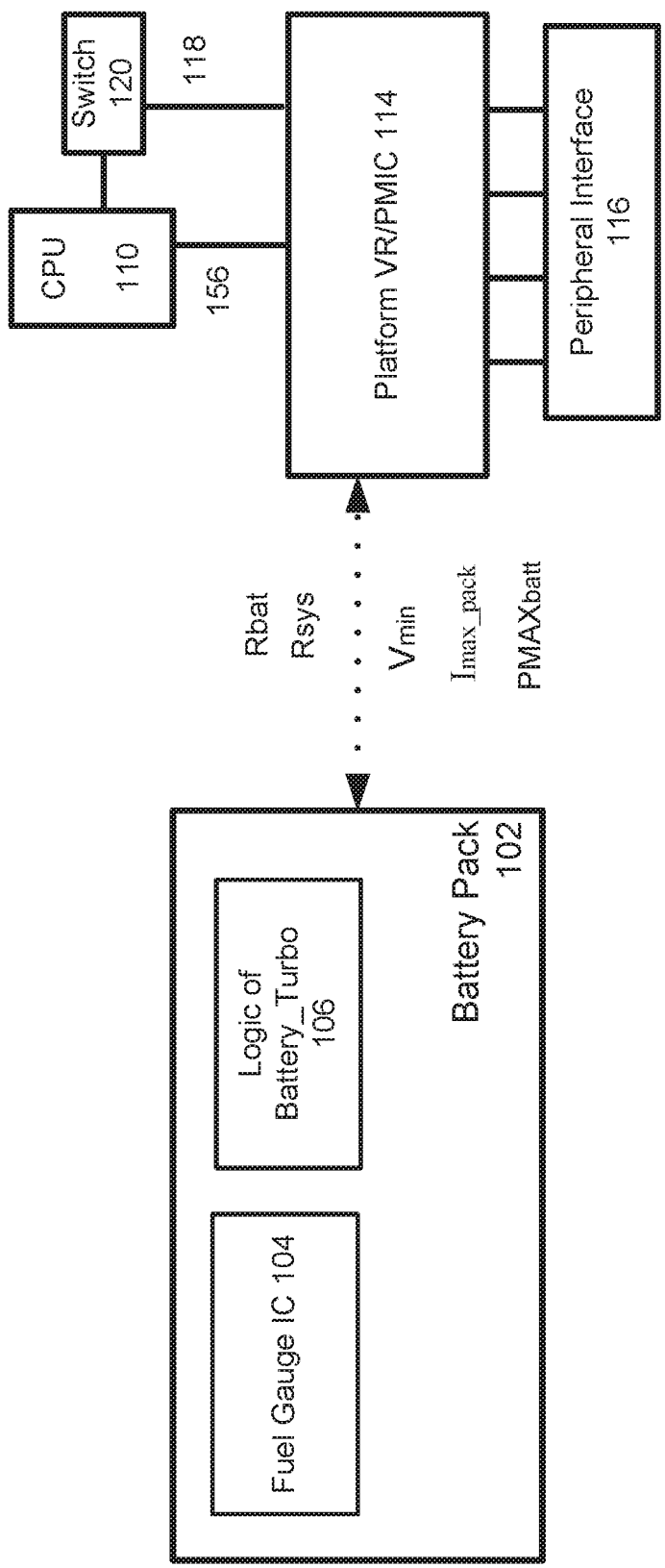
FIG. 1b illustrates a system for dynamic battery power in accordance with an example embodiment.

In one example, as illustrated in the diagram of FIG. 1b, a battery pack 102 can be configured to identify, determine, calculate, or measure one or more parameters including a battery impedance or resistance (e.g., $R_{batt}$), a system impedance or resistance (e.g., $R_{sys}$), a minimum system voltage (e.g., $V_{min}$), a maximum current from the battery pack (e.g., $I_{max\_pack}$), or a maximum power from the battery pack (e.g., Pmax_batt) using the fuel gauge IC 104 and/or the logic of Battery_Turbo 106.

In one example, the battery pack 102 can include a fuel gauge integrated circuit (IC) 104 and turbo logic in the battery 106 (e.g., logic of Battery_Turbo). The battery pack 102 can be configured to send a value for the maximum power for the battery, Pmax_batt, to an embedded controller (EC) and/or dynamic battery power technology (DBPT) firmware or software. The Pmax_batt can be updated on a periodic basis. In one example, the Pmax_batt can be updated in a period of approximately 1 second or less.

In one example, dynamic battery power technology (DBPT) can be configured to determine a value of a parameter power level 4 (PL4) based on the value of Pmax_batt. In one example, PL4 can be updated on a periodic basis. In one example, PL4 can be a power level that may not be exceeded. The DBPT can be configured to interface with a platform environmental control interface (PECI) or a model specific register (MSR). The performance of the CPU 110 can be controlled by any of the foregoing parameters and components and/or the foregoing parameters and components can be controlled by the CPU 110.

Figure 1C:
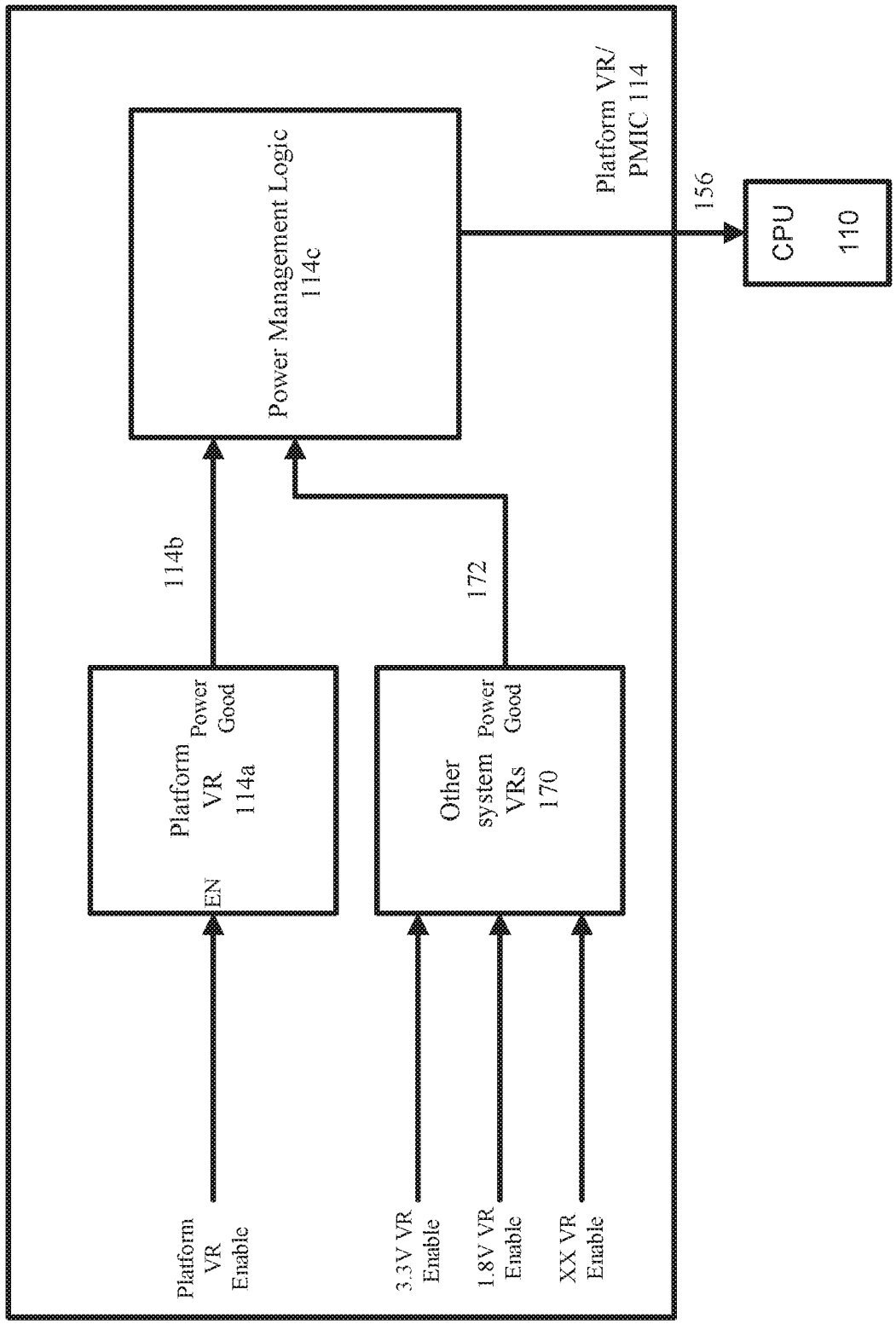
FIG. 1c illustrates a system for dynamic battery power in accordance with an example embodiment.

In one example, as illustrated in FIG. 1c, a platform VR 114a and other system VRs 170 can be configured to provide power good signals 114b and 172 to a power management logic block 114c. In this example, the platform VR can be connected to an enable switch. The other system VRs, which can include a 3.3V VR, a 1.8V VR, or a VR of any other voltage, can each be connected to an enable switch.

In one example, the platform VR and/or PMIC 114 can comprise a platform VR 114a and power management logic 114c. The platform VR and/or PMIC 114 can further comprise an enable switch to the platform VR 114a and a connection 114b between the platform VR 114a and power management logic block 114c. The other system VRs 170 can be included inside or outside the platform VR and/or PMIC 114. The platform VR and/or PMIC 114 can be connected to the CPU 110 via the connection 156.

Figure 1D:
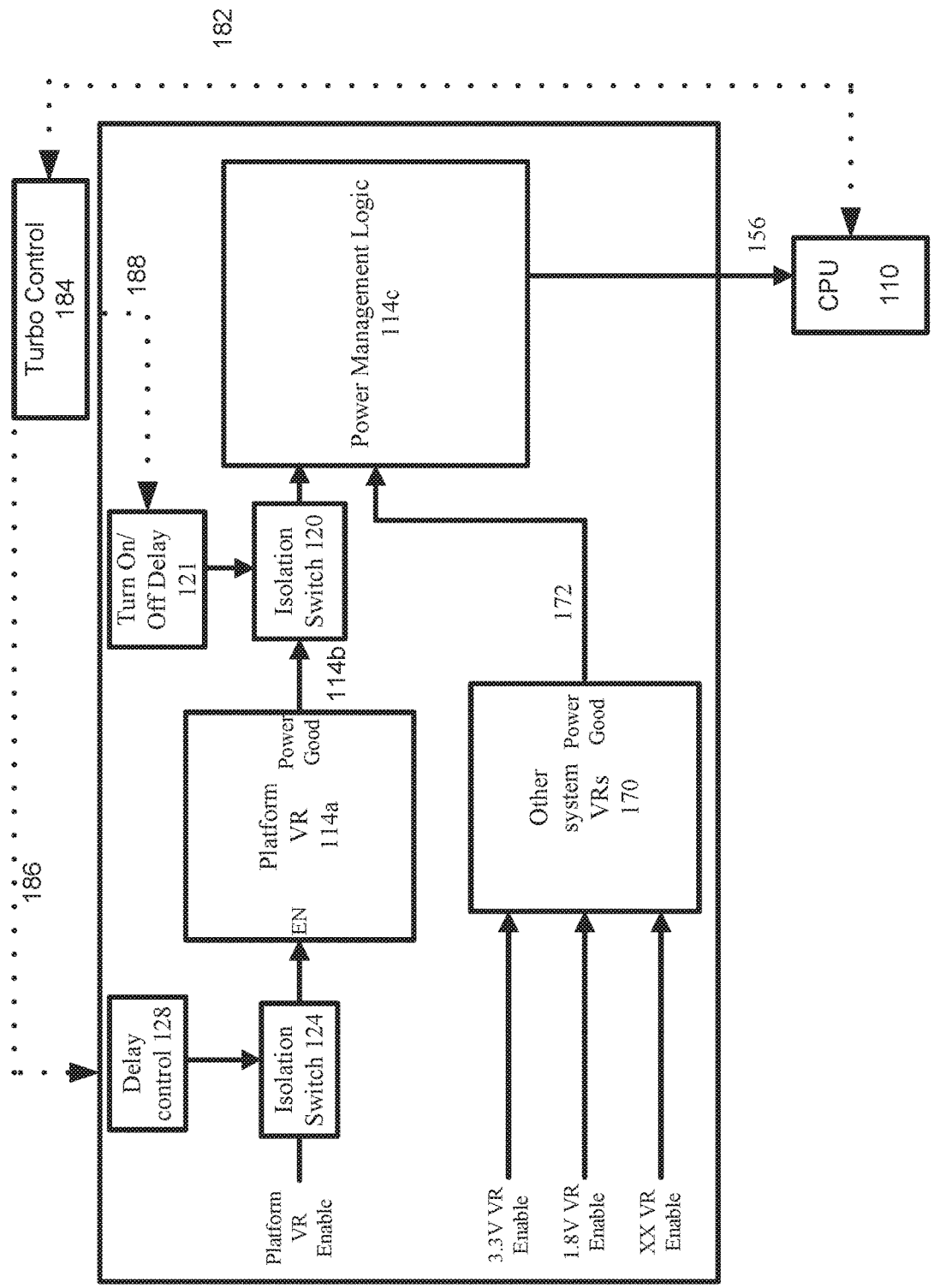
FIG. 1d illustrates a system for dynamic battery power in accordance with an example embodiment.

In one example, as illustrated in FIG. 1d, a platform VR 114a and other system VRs 170 can be configured to provide power good signals 114b and 172 to a power management logic block 114c. In this example, the platform VR 114a can be connected, directly or indirectly, to an enable switch. The other system VRs 170, which can include a 3.3V VR, a 1.8V VR, or a VR of any other voltage, can each be connected to an enable switch.

In one example, an isolation switch 120 can be configured to mask the power good signal 114b from the platform VR 114a. In another example, the isolation switch 120 can be configured to unmask the power good signal 114b from the platform VR 114a. The isolation switch 120 can be configured to mask the power good signal 114b from the platform VR 114a when a peripheral interface connection state is identified as disconnected. The isolation switch 114a can be configured to unmask the power good signal 114b from the platform VR 114a when a peripheral interface connection state is identified as connected.

In one example, an isolation switch 124 can be configured to disable the platform VR 114a. In another example, the isolation switch 124 can be configured to enable the platform VR 114a.

In one example, the isolation switch 120 can be activated or deactivated by a turn on/off delay controller 121. The isolation switch 124 can be activated or deactivated by a delay controller 128. Each of the turn on/off delay controller 121 and the delay controller 128 can be controlled by one or more processors (e.g., a turbo controller 184) via connections 186 and 188. The turbo control 184 can be controlled by the CPU 110.

In one example, a power source (e.g., a battery pack) can be configured to provide an input power to the platform VR. In one example, the power source can be a 2-cell battery. In one example, the power source can be internal to the device. In one example, the power source can be external to the device.

In one example, a peripheral can be configured to be connected to a peripheral interface. The platform VR can be configured to power the peripheral interface. The peripheral interface can have a peripheral interface connection state that can be identified as connected when a peripheral is connected to the peripheral interface. The peripheral interface can have a peripheral interface connection state that can be identified as disconnected when a peripheral is disconnected or not connected from the peripheral interface. In one example, a peripheral interface can include one or more of an audio amplifier port, a high-definition multimedia interface (HDMI) port, or a universal serial bus (USB) port. In one example, the device can be configured to operate in a battery-only mode.

In one example, a device can comprise one or more of a peripheral interface, a platform VR, an isolation switch, one or more processors, a break-before-make (BBM) switch or a knob configured to modify a soft-start timing of the platform VR. The BBM switch can be configured to prevent the power draw from the CPU Turbo and the in rush of current from platform VR from coinciding when the platform VR is turned on. In one example, a knob can be configured to modify a soft-start timing of the platform VR to limit the inrush of current when the platform VR is turned on.

Figure 2A:
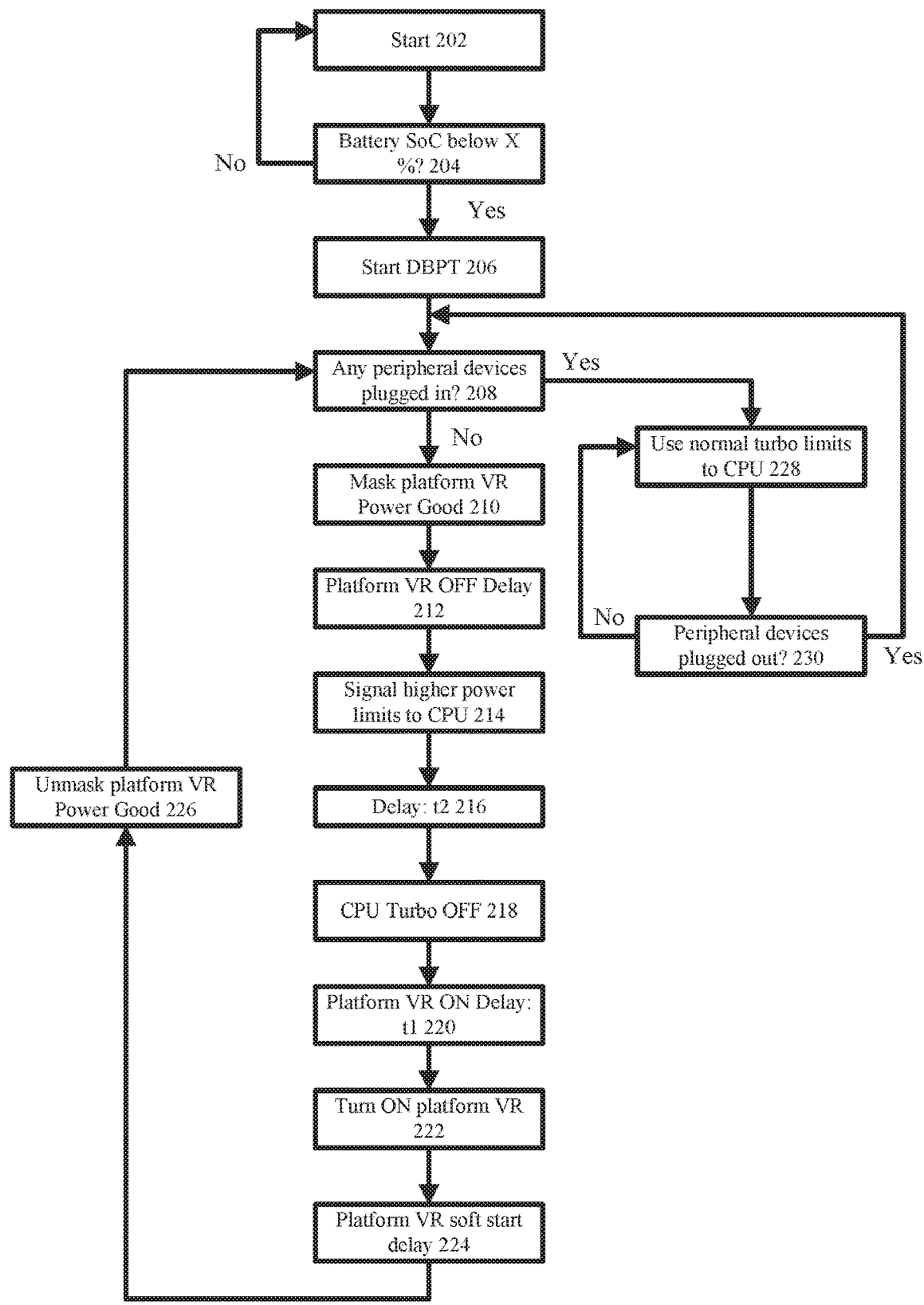
FIG. 2a depicts a diagram to extend a level of processor performance in accordance with an example embodiment.

In one example, as illustrated in FIG. 2a, one or more processors can be configured to determine whether to extend a level of processor performance. In operation 202, one or more processors can be configured to start a plurality of operations. In operation 204, the one or more processors can determine whether the state of charge of a battery is below a threshold. When the state of charge of the battery is below the threshold, dynamic battery power technology (DBPT) can be commenced in operation 206. When the state of charge of the battery is not below the threshold, operation 202 can be commenced.

In another example, the one or more processors can identify a system voltage of the device and a minimum system voltage of the device in operation 204 and determine whether the system voltage of the device is less than the minimum system voltage of the device. When the system voltage of the device is below the minimum system voltage of the device, dynamic battery power technology (DBPT) can be commenced in operation 206. When the system voltage of the device is not below the minimum system voltage of the device, operation 202 can be commenced.

In one example, the one or more processors can be configured to identify a peripheral interface connection state in operation 208. If the peripheral interface connection state is identified as disconnected, the one or more processors can be configured to mask a power good signal of a platform VR in operation 210. The one or more processors can be configured to activate a time delay before the masking of the power good signal. In another example, if the peripheral interface connection state is identified as disconnected, the one or more processors can be configured to turn off a platform VR in operation 210.

In one example, after the power good signal of the platform VR has been masked in operation 210 or the platform VR has been turned off in operation 210, a time delay can occur in operation 212. After the time delay, the one or more processors can be configured to signal higher turbo limits to one or more processors (e.g., a CPU) in operation 214. The one or more processors can signal the higher turbo limits by identifying an updated minimum system voltage of the device and determining whether to extend a level of processor performance based on the updated minimum system voltage of the device.

In one example, a time delay can occur in operation 216. After the time delay in operation 216, the one or more processors can be configured to turn off the CPU turbo in operation 218. In this operation, the one or more processors can use a minimum system voltage of the device instead of the updated minimum system voltage of the device. A time delay can follow in operation 220. After the time delay, the one or more processors can be configured to turn on the platform VR in operation 222 if the platform VR has been turned off. A soft start delay can be used for the platform VR in operation 224. The one or more processors can be configured to unmask the power good of the platform VR in operation 226. The one or more processors can be configured to revert back to operation 208.

In one example, the one or more processors can be configured to identify a peripheral interface connection state in operation 208. If the peripheral interface connection state is identified as connected, the one or more processors can be configured to signal normal turbo limits to the CPU in operation 228. The one or more processors can be configured to periodically identify whether a peripheral interface connection state is identified as disconnected in operation 230. When the one or more processors identify the peripheral interface connection state as connected in operation 230, the one or more processors can be configured to revert back to operation 228. When the one or more processors identify the peripheral interface connection state as disconnected in operation 230, the one or more processors can be configured to revert back to operation 208.

Figure 2B:
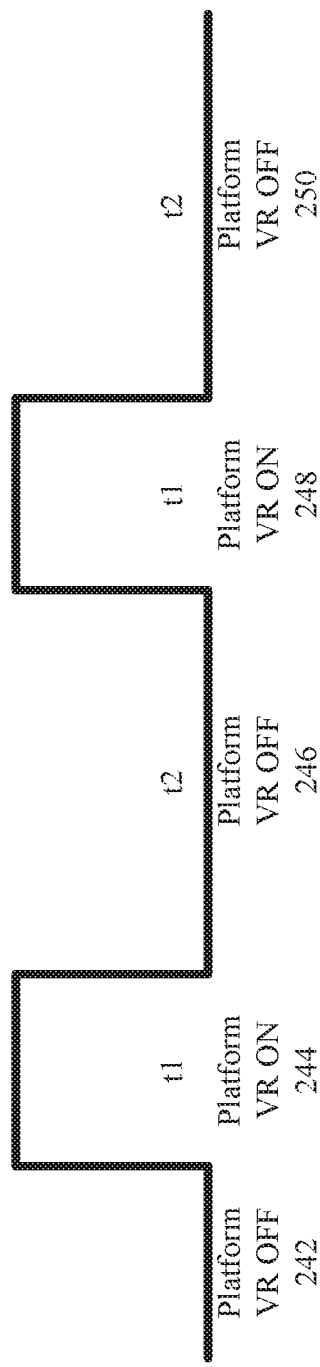
FIG. 2b illustrates functionality of a platform voltage regulator (VR) in accordance with an example embodiment.

In one example, as illustrated in FIG. 2b, a platform VR can be configured to be turned on and off periodically so that one or more processors can monitor a peripheral interface connection state for a time period t1. In an example, t1 can include a range of less than 100 milliseconds. In another example, t1 can include a range of less than a threshold (e.g., 500 milliseconds), wherein the threshold can vary depending on system constraints. In the time period t2, the one or more processors may not monitor the peripheral interface connection state. In an example, t2 can include a range of less than 100 milliseconds. In another example, t2 can include a range of less than a threshold (e.g., 500 milliseconds), wherein the threshold can vary depending on system constraints. The time periods, t1 and t2, can be decreased to allow the one or more processors to monitor the peripheral interface connection state more frequently.

In one example, one or more processors can identify periodically the peripheral interface connection state. The platform VR can be off at 242. The platform VR can be turned on at 244 for a duration of t1, and the one or more processors can monitor the peripheral interface connection state. The platform VR can be turned off at 246 for a duration of t2, and the one or more processors may not monitor the peripheral interface connection state. The platform VR can be turned on at 248 for a duration of t1, and the one or more processors can monitor the peripheral interface connection state. The platform VR can be turned off at 250 for a duration of t2, and the one or more processors may not monitor the peripheral interface connection state, and so forth. In one example, the platform VR can be configured to be on while the one or more processors can periodically monitor the peripheral interface connection state.

Figure 3A:
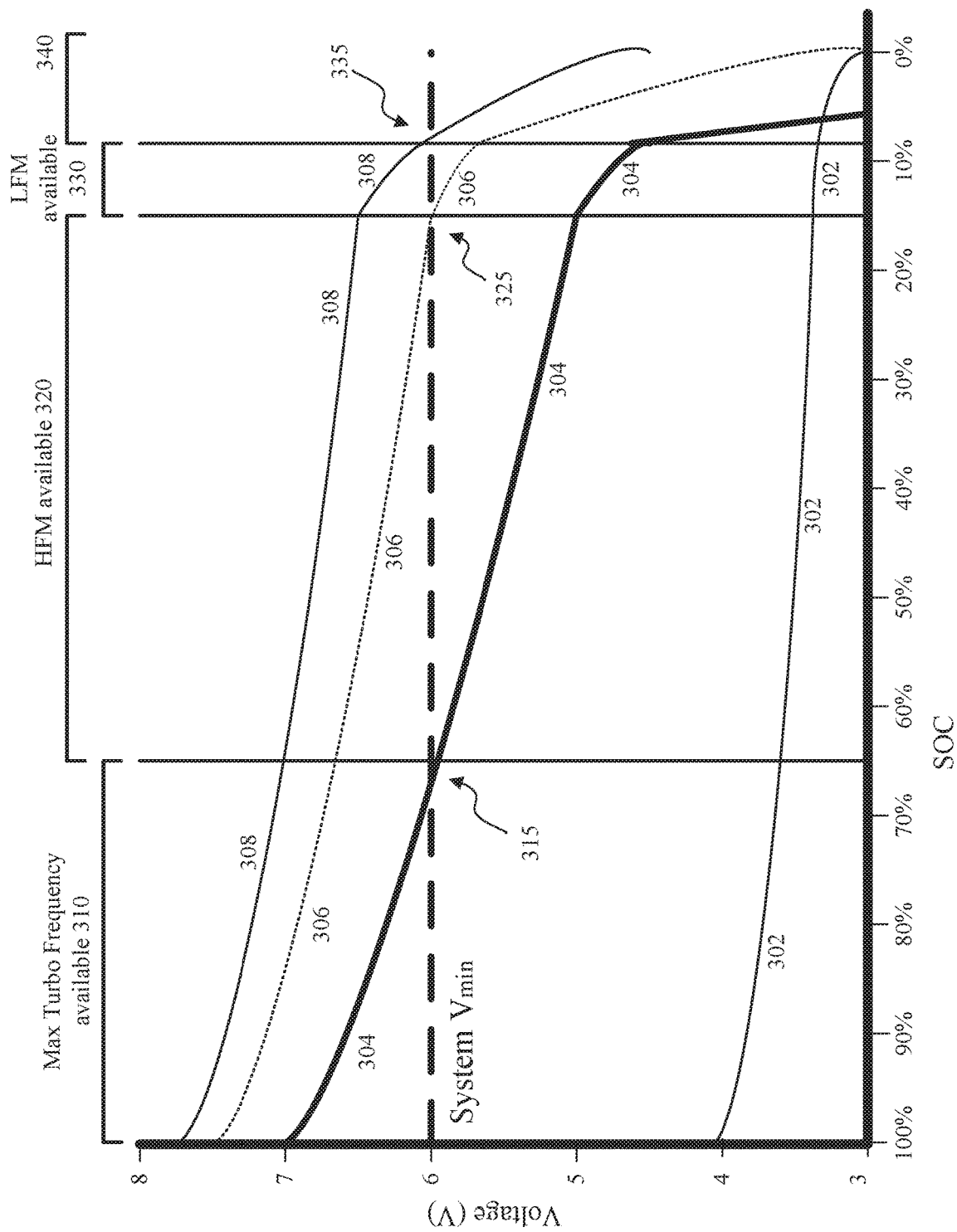
FIG. 3a depicts a graph of output voltage at various power levels in accordance with an example embodiment.

In one example, as illustrated in the graph in FIG. 3a, an output voltage of a battery pack (e.g., a 2S2P battery pack) can be determined based on a state of charge (SoC) for the battery and various platform power levels.

In one example, 302, a battery cell can range between an output voltage of approximately 4 volts at a state of charge of approximately 100% to an output voltage between 3.0 volts and 3.5 volts for a state of charge of approximately 10%. In this example, the output voltage of the battery cell can decrease as the state of charge of the battery cell decreases.

In one example, 304, a battery pack at a power level of 70 watts can range between an output voltage of approximately 7 volts at a state of charge of approximately 100% to an output voltage of approximately 4.5 volts at a state of charge of approximately 10%. In this example, as the state of charge of the battery pack decreases from approximately 100% to approximately 65%, the output voltage of the battery pack can decrease from an output voltage of approximately 7 volts to an output voltage of approximately 6 volts (315). In this range 310 of the state of charge (e.g., from 100% to 65%), in this example, maximum turbo frequency can be available.

In one example, 306, for a battery pack at a power level of 40 watts and when the state of charge of the battery pack has decreased below approximately 65%, high frequency mode (HFM) can be available in a range 320 between approximately 65% and 15%. In this range for the state of charge, the output voltage can range between approximately 7 volts for a state of charge of approximately 65% to 6 volts (325) for a state of charge of approximately 15%.

In one example, 308, for a battery pack at a power level of 29 watts and when the state of charge of the battery pack has decreased below approximately 15%, low frequency mode (LFM) can be available in a range 330 between approximately 15% and 10%. In this range for the state of charge, the output voltage can range between approximately 6.5 volts for a state of charge of approximately 15% to approximately 6 volts (335) for a state of charge of approximately 10%.

In one example, when the state of charge of the battery pack has decreased below approximately 10%, none of maximum turbo frequency, HFM, or LFM can be available.

Figure 3B:
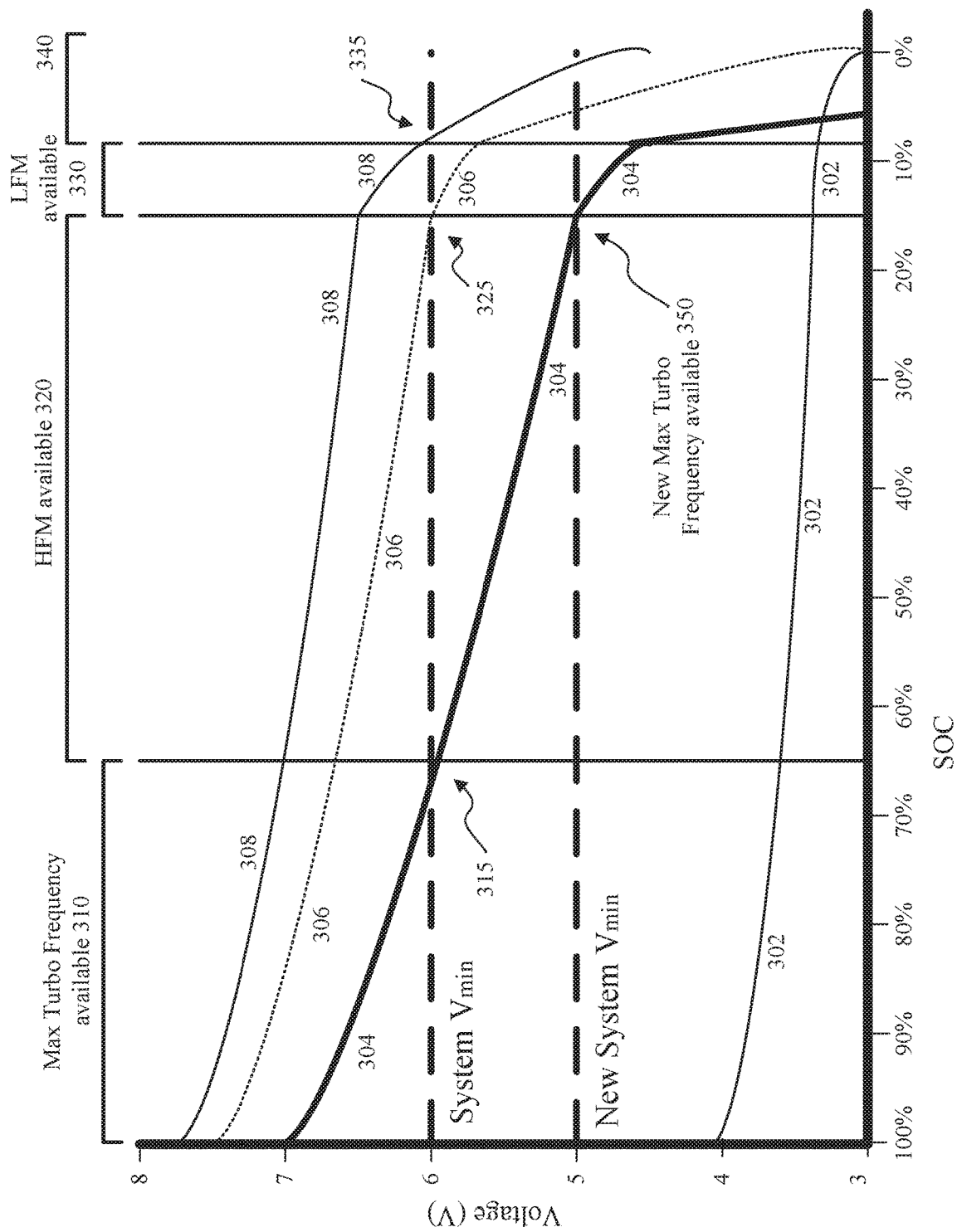
FIG. 3b depicts a graph of output voltage at various power levels in accordance with an example embodiment.

In one example, as illustrated in the graph in FIG. 3b, an output voltage of a battery pack (e.g., a 2S2P battery pack) can be determined based on a state of charge (SoC) for the battery and various platform power levels.

In one example, 304, a battery pack at a power level of 70 watts can range between an output voltage of approximately 7 volts at a state of charge of approximately 100% to an output voltage of approximately 4.5 volts at a state of charge of approximately 10%. In this example, as the state of charge of the battery pack decreases from approximately 100% to approximately 65%, the output voltage of the battery pack can decrease from an output voltage of approximately 7 volts to an output voltage of approximately 6 volts (315). In this range 310 of the state of charge (e.g., from 100% to 65%), maximum turbo frequency can be available as before.

In one example, 304, as the state of charge of the battery pack decreases from approximately 65% to approximately 15%, the output voltage of the battery pack can decrease from an output voltage of approximately 6 volts to an output voltage of approximately 5 volts (350). In this range 320 of the state of charge (e.g., from 65% to 15%), in this example, maximum turbo frequency can also be available if the System $V_{min}$ of 6 volts has been lowered to the New System $V_{min}$ of 5 volts.

Figure 4:
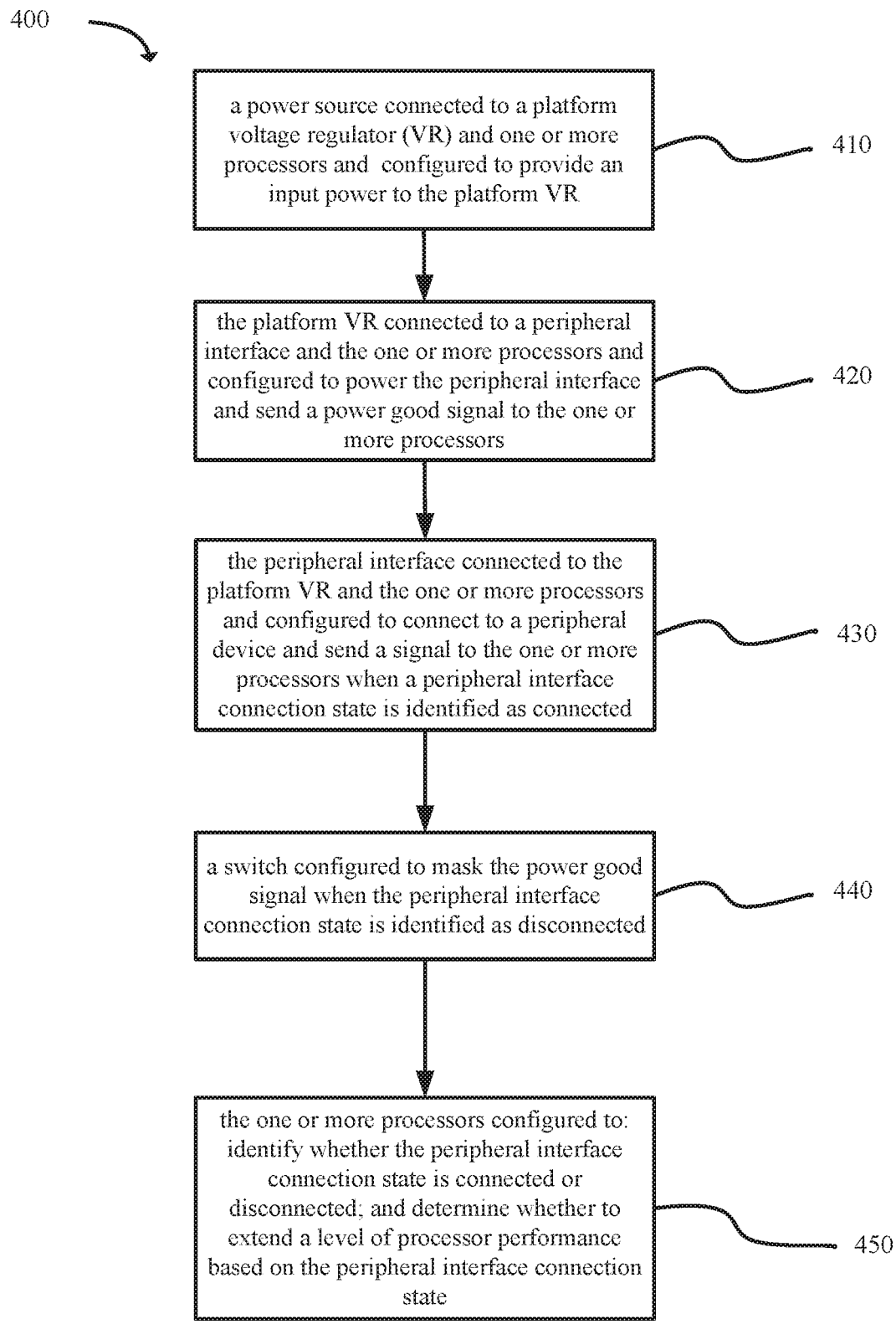
FIG. 4 depicts a system operable to extend a level of processor performance in accordance with an example embodiment.

Another example provides functionality 400 of a system, as shown in the flow chart in FIG. 4. The system can comprise a power source connected to a platform voltage regulator (VR) and one or more processors and configured to provide an input power to the platform VR, as in block 410. The system can further comprise the platform VR connected to a peripheral interface and the one or more processors and configured to power the peripheral interface and send a power good signal to the one or more, as in block 420. The system can further comprise the peripheral interface connected to the platform VR and the one or more processors and configured to connect to a peripheral device and send a signal to the one or more processors when a peripheral interface connection state is identified as connected, as in block 430. The system can further comprise a switch configured to mask the power good signal when the peripheral interface connection state is identified as disconnected, as in block 440. The system can further comprise the one or more processors configured to identify whether the peripheral interface connection state is connected or disconnected; and determine whether to extend a level of processor performance based on the peripheral interface connection state, as in block 450.

Figure 5:
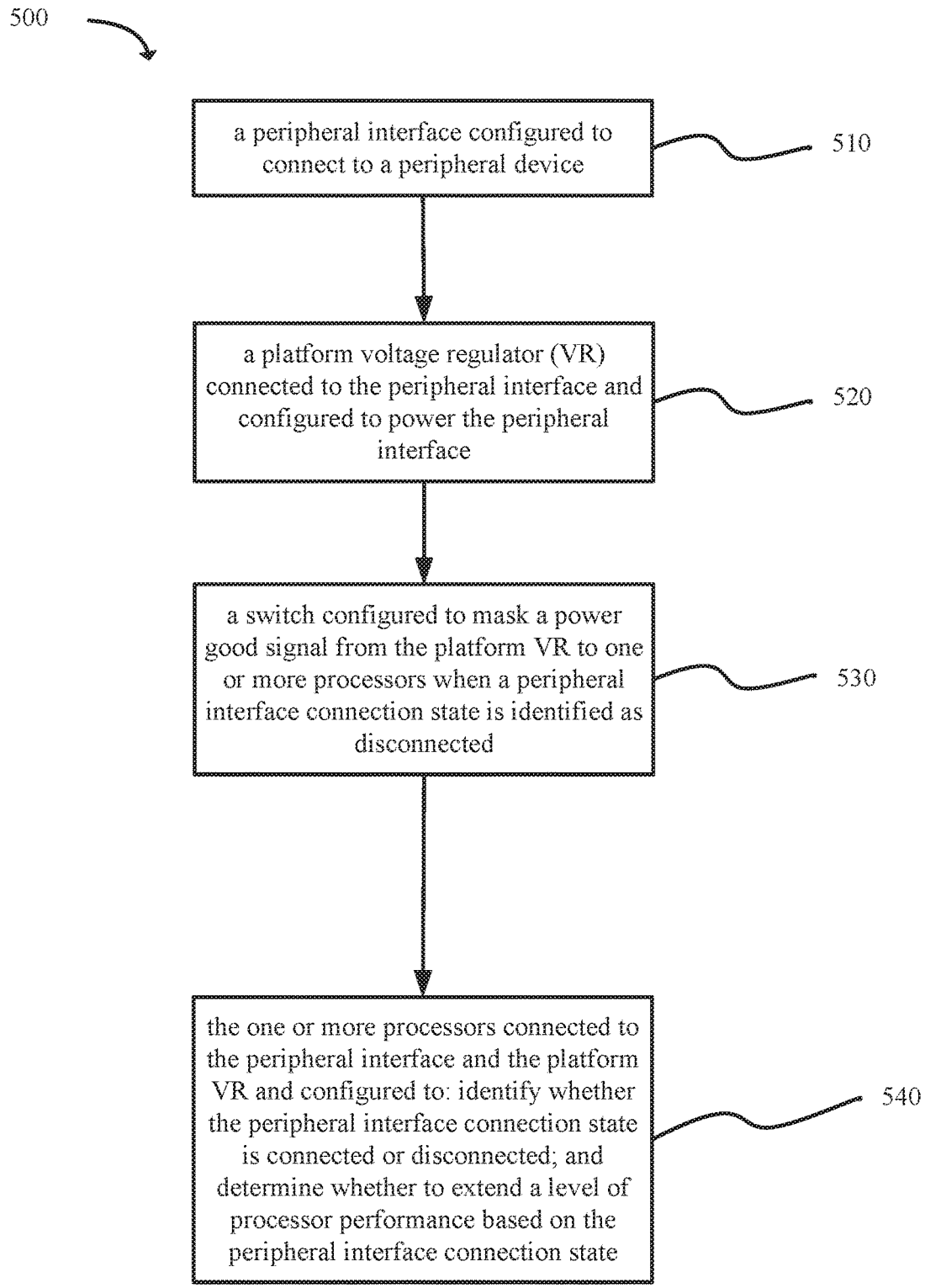
FIG. 5 depicts a device operable to extend a level of processor performance in accordance with an example embodiment.

Another example provides functionality 500 of a device, as shown in the flow chart in FIG. 5. The device can comprise a peripheral interface configured to connect to a peripheral device, as in block 510. The device can comprise a platform voltage regulator (VR) connected to the peripheral interface and configured to power the peripheral interface, as in block 520. The device can comprise a switch configured to mask a power good signal from the platform VR to one or more processors when a peripheral interface connection state is identified as disconnected, as in block 530. The device can comprise one or more processors configured to identify whether the peripheral interface connection state is connected or disconnected; and determine whether to extend a level of processor performance based on the peripheral interface connection state, as in block 540.

Figure 6:
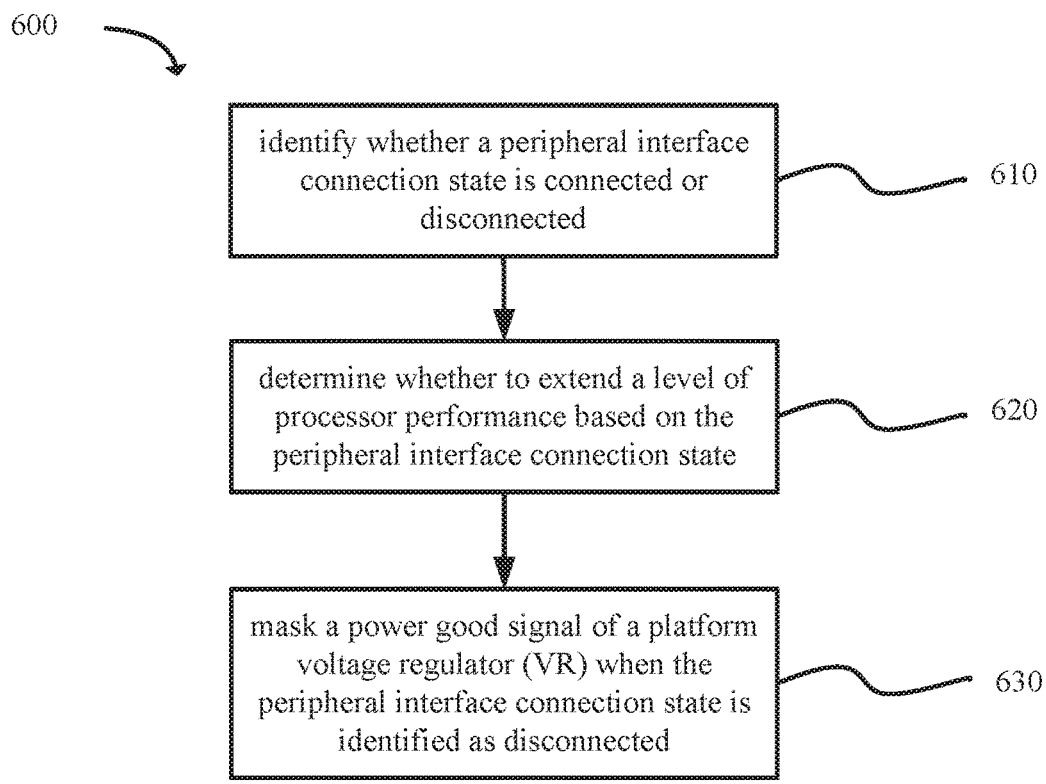
FIG. 6 depicts functionality operable to extend a level of processor performance in accordance with an example embodiment.

Another example provides functionality 600 of a device component, as shown in the flow chart in FIG. 6. The apparatus can comprise one or more processors. The one or more processors can be configured to identify whether a peripheral interface connection state is connected or disconnected, as in block 610. The one or more processors can be configured to determine whether to extend a level of processor performance based on the peripheral interface connection state, as in block 620. The one or more processors can be configured to mask a power good signal of a platform voltage regulator (VR) when the peripheral interface connection state is identified as disconnected, as in block 630.

Figure 7:
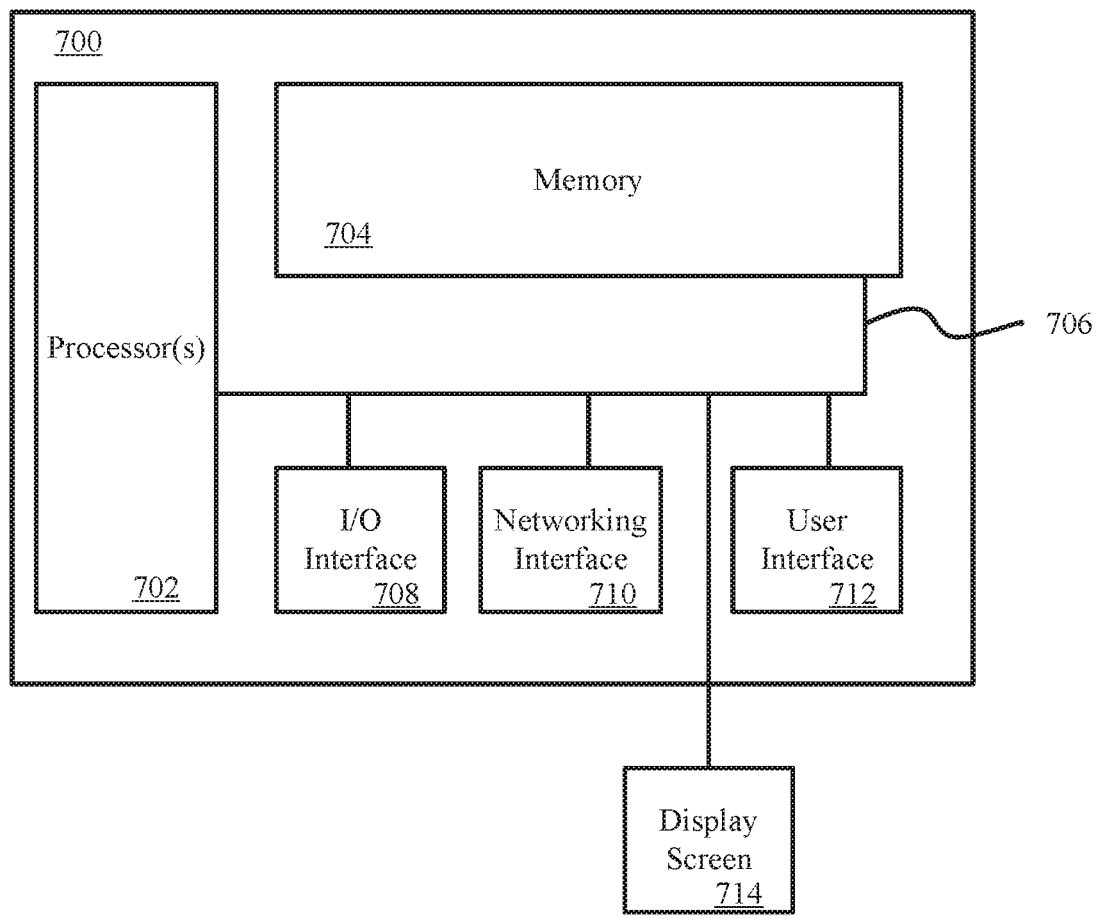
FIG. 7 illustrates a computing system that includes a data storage device in accordance with an example embodiment.

FIG. 7 illustrates a general computing system or device 700 that can be employed in the present technology. The computing system 700 can include a processor 702 in communication with a memory 704. The memory 704 can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof.

The computing system or device 700 additionally includes a local communication interface 706 for connectivity between the various components of the system. For example, the local communication interface 706 can be a local data bus and/or any related address or control busses as may be desired.

The computing system or device 700 can also include an I/O (input/output) interface 708 for controlling the I/O functions of the system, as well as for I/O connectivity to devices outside of the computing system 700. A network interface 710 can also be included for network connectivity. The network interface 710 can control network communications both within the system and outside of the system. The network interface can include a wired interface, a wireless interface, a Bluetooth interface, optical interface, and the like, including appropriate combinations thereof. Furthermore, the computing system 700 can additionally include a user interface 712, a display device 714, as well as various other components that would be beneficial for such a system.

The processor 702 can be a single or multiple processors, and the memory 704 can be a single or multiple memories. The local communication interface 706 can be used as a pathway to facilitate communication between any of a single processor, multiple processors, a single memory, multiple memories, the various interfaces, and the like, in any useful combination.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific technology embodiments and point out specific features, elements, or steps that can be used or otherwise combined in achieving such embodiments.

In one example there is provided, a system that can comprise: a power source connected to a platform voltage regulator (VR) and one or more processors and configured to provide an input power to the platform VR; the platform VR connected to a peripheral interface and the one or more processors and configured to power the peripheral interface and send a power good signal to the one or more processors; the peripheral interface connected to the platform VR and the one or more processors and configured to connect to a peripheral device and send a signal to the one or more processors indicating a peripheral interface connection state; a switch configured to mask the power good signal when the peripheral interface connection state is identified as disconnected; and the one or more processors configured to: identify whether the peripheral interface connection state is connected or disconnected; and determine whether to extend a level of processor performance based on the peripheral interface connection state.

In one example of a system, the one or more processors can be further configured to: identify a system voltage and a minimum system voltage; identify an updated minimum system voltage; and determine whether to extend a level of processor performance based on the updated minimum system voltage.

In one example of a system, the switch can be an isolation switch connected between the platform VR and the one or more processors.

In one example of a system, the one or more processors can be further configured to activate the isolation switch when the peripheral interface connection state is identified as disconnected.

In one example of a system, the one or more processors can be further configured to receive a signal from the peripheral interface that indicates the peripheral interface connection state when a system voltage of a device is lower than a minimum system voltage of the device.

In one example of a system, the one or more processors can comprise one or more of a central processing unit (CPU) or a power management integrated circuit (PMIC).

In one example of a system, the power source can include a 2-cell battery.

In one example of a system, the power source can be internal.

In one example of a system, the power source can be external.

In one example of a system, the system can further comprise an isolation switch connected to the platform VR and the one or more processors and configured to enable the platform VR.

In one example of a system, the system can further comprise a delay controller connected to the isolation switch.

In one example of a system, the one or more processors can be further configured to: activate a delay before a masking of the power good signal; or activate a delay before an unmasking of the power good signal.

In one example of a system, the peripheral interface can be one or more of an audio amplifier port, a high-definition multimedia interface (HDMI) port, or a universal serial bus (USB) port.

In one example of a system, the system can be configured to operate in a battery-only mode.

In one example of a system, the system can further comprise one or more of: a 5 volt VR; a 3.3 volt VR; a 1.8 volt VR; or a VR of any other voltage.

In one example of a system, the system can further comprise one or more of: a break-before-make (BBM) switch configured to limit current and power when the platform VR is turned on; or a knob configured to modify a soft-start timing of the platform VR.

In one example, there is provided a device that can comprise: a peripheral interface configured to connect to a peripheral device; a platform voltage regulator (VR) connected to the peripheral interface and configured to power the peripheral interface; a switch configured to mask a power good signal from the platform VR to one or more processors when a peripheral interface connection state is identified as disconnected; and the one or more processors connected to the peripheral interface and the platform VR and configured to: identify whether the peripheral interface connection state is connected or disconnected; and determine whether to extend a level of processor performance based on the peripheral interface connection state.

In one example of a device, the one or more processors can be further configured to: identify a system voltage and a minimum system voltage of the device; identify an updated minimum system voltage of the device; and determine whether to extend a level of processor performance based on the updated minimum system voltage of the device.

In one example of a device, the switch can be an isolation switch connected between the platform VR and the one or more processors.

In one example of a device, the one or more processors can be further configured to activate the isolation switch when the peripheral interface connection state is identified as disconnected.

In one example of a device, the one or more processors can be further configured to receive a signal from the peripheral interface indicating the peripheral interface connection state when a system voltage is lower than a minimum system voltage.

In one example of a device, the one or more processors can comprise one or more of a central processing unit (CPU) or a power management integrated circuit (PMIC).

In one example of a device, the device can further comprise a power source configured to provide an input power to the platform VR.

In one example of a device, the power source can include a 2-cell battery.

In one example of a device, the power source can be internal to the device.

In one example of a device, the power source can be external to the device.

In one example, the device can further comprise an isolation switch connected to the platform VR and configured to enable the platform VR.

In one example of a device, the device can further comprise a delay controller connected to the isolation switch.

In one example of a device, the one or more processors can be further configured to: activate a delay before a masking of the power good signal; or activate a delay before an unmasking of the power good signal.

In one example of a device, the peripheral interface can be one or more of an audio amplifier port, a high-definition multimedia interface (HDMI) port, or a universal serial bus (USB) port.

In one example of a device, the device can be configured to operate in a battery-only mode.

In one example of a device, the device can further comprise one or more of: a 5 volt VR; a 3.3 volt VR; a 1.8 volt VR; or a VR of any other voltage.

In one example of a device, the device can further comprise one or more of: a break-before-make (BBM) switch configured to limit current and power when the platform VR is turned on; or a knob configured to modify a soft-start timing of the platform VR.

In one example there is provided a device component that can comprise one or more processors configured to: identify a peripheral interface connection state; determine whether to extend a level of processor performance based on the peripheral interface connection state; and mask a power good signal of a platform voltage regulator (VR) when the peripheral interface connection state is identified as disconnected.

In one example of a device component, the one or more processors can be further configured to: identify a system voltage and a minimum system voltage of a device; identify an updated minimum system voltage of the device; and determine whether to extend a level of processor performance based on the updated minimum system voltage of the device.

In one example of a device component, the one or more processors can be further configured to: activate a delay before a masking of the power good signal; or activate a delay before an unmasking of the power good signal.

In one example of a device component, the one or more processors can be further configured to: turn off the platform VR when the peripheral interface connection state is identified as disconnected.

In one example of a device component, the one or more processors can be further configured to: identify periodically the peripheral interface connection state.

In one example of a device component, the one or more processors can be further configured to: use a minimum system voltage of a device when the platform VR is turned on; identify the peripheral interface connection state when the platform VR is turned on; turn off the platform VR when the peripheral interface connection state is identified as disconnected; and use an updated minimum system voltage of the device when the platform VR is turned off.

In one example of a device component, the one or more processors can be further configured to: unmask the power good signal of the platform VR when the peripheral interface connection state is identified as connected.

In one example of a device component, the one or more processors can be further configured to: use a minimum system voltage of the device when the peripheral interface connection state is identified as connected.

In one example of a device component, the one or more processors can be further configured to: monitor a platform VR output; identify the peripheral interface connection state when the platform VR output is monitored; mask the power good signal of the platform VR when the peripheral interface connection state is identified as disconnected; and use an updated minimum system voltage of a device when the power good signal of the platform VR is masked.

In one example of a device component, the one or more processors can be further configured to: identify a first time period when the peripheral interface connection state is monitored.

In one example of a device component, the one or more processors can be further configured to: identify a second time period when the peripheral interface connection state is not monitored.

In one example of a device component, the one or more processors can be further configured to: identify a state of charge of a battery in a device; identify a threshold for the state of charge; and determine whether the state of charge of the battery in the device is less than the threshold for the state of charge.

In one example of a device component, the device component can be included in a device that is configured to operate in a battery-only mode.

In one example of a device component, the platform VR can be a 5 volt (V) VR.

In one example there is provided, a method for extending a level of processor performance in a device can comprise: configuring one or more processors to: identify whether a peripheral interface connection state is connected or disconnected; determine whether to extend a level of processor performance based on the peripheral interface connection state; and mask a power good signal of a platform voltage regulator (VR) when the peripheral interface connection state is identified as disconnected.

In one example of a method for extending a level of processor performance, the method can further comprise configuring one or more processors to: identify a system voltage and a minimum system voltage of the device; identify an updated minimum system voltage of the device; and determine whether to extend a level of processor performance based on the updated minimum system voltage of the device.

In one example, the method can further comprise configuring one or more processors to: activate a delay before a masking of the power good signal; and activate a delay before an unmasking of the power good signal.

In one example of a method of extending processor performance, the method can further comprise configuring one or more processors to: turn off the platform VR when the peripheral interface connection state is identified as disconnected.

In one example of a method of extending processor performance, the method can further comprise configuring one or more processors to: identify periodically the peripheral interface connection state.

In one example of a method of extending processor performance, the method can further comprise configuring one or more processors to: use a minimum system voltage of the device when the platform VR is turned on; identify the peripheral interface connection state when the platform VR is turned on; turn off the platform VR when the peripheral interface connection state is identified as disconnected; and use an updated minimum system voltage of the device when the platform VR is turned off.

In one example of a method of extending processor performance, the method can further comprise configuring one or more processors to: unmask the power good signal of the platform VR when the peripheral interface connection state is identified as connected.

In one example of a method of extending processor performance, the method can further comprise configuring one or more processors to: use a minimum system voltage of the device when the peripheral interface connection state is identified as connected.

In one example of a method of extending processor performance, the method can further comprise configuring one or more processors to: monitor a platform VR output; identify the peripheral interface connection state when the platform VR output is monitored; mask the power good signal of the platform VR when the peripheral interface connection state is identified as disconnected; and use an updated minimum system voltage of the device when the power good signal of the platform VR is masked.

In one example of a method of extending processor performance, the method can further comprise configuring one or more processors to: identify a first time period when the peripheral interface connection state is monitored.

In one example of a method of extending processor performance, the method can further comprise configuring one or more processors to: identify a second time period when the peripheral interface connection state is not monitored.

In one example of a method of extending processor performance, the method can further comprise configuring one or more processors to: identify a state of charge of a battery in the device; identify a threshold for the state of charge; and determine whether the state of charge of the battery in the device is less than the threshold for the state of charge.

In one example of a method of extending processor performance, the method can further comprise the device configured to operate in a battery-only mode.

In one example of a method of extending processor performance, the method can further comprise the platform VR is a 5 volt (V) VR.

In one example there is provided, a non-transitory machine readable storage medium having instructions embodied thereon for extending a level of processor performance, the instructions when executed by one or more processors at a device can perform the following: identifying whether a peripheral interface connection state is connected or disconnected; determining whether to extend a level of processor performance based on the peripheral interface connection state; and masking a power good signal of a platform voltage regulator (VR) when the peripheral interface connection state is identified as disconnected.

In one example, the non-transitory machine readable storage medium can further comprise instructions that when executed perform the following: identifying a system voltage and a minimum system voltage of the device; identifying an updated minimum system voltage of the device; and determine whether to extend a level of processor performance based on the updated minimum system voltage of the device.

In one example, the non-transitory machine readable storage medium can further comprise instructions that when executed perform the following: activating a delay before a masking of the power good signal; and activating a delay before an unmasking of the power good signal.

In one example, the non-transitory machine readable storage medium can further comprise instructions that when executed perform the following: turning off the platform VR when the peripheral interface connection state is identified as disconnected.

In one example, the non-transitory machine readable storage medium can further comprise instructions that when executed perform the following: identifying periodically the peripheral interface connection state.

In one example, the non-transitory machine readable storage medium can further comprise instructions that when executed perform the following: using a minimum system voltage of the device when the platform VR is turned on; identifying the peripheral interface connection state when the platform VR is turned on; turning off the platform VR when the peripheral interface connection state is identified as disconnected; and using an updated minimum system voltage of the device when the platform VR is turned off.

In one example, the non-transitory machine readable storage medium can further comprise instructions that when executed perform the following: unmasking the power good signal of the platform VR when the peripheral interface connection state is identified as connected.

In one example, the non-transitory machine readable storage medium can further comprise instructions that when executed perform the following: using a minimum system voltage of the device when the peripheral interface connection state is identified as connected.

In one example, the non-transitory machine readable storage medium can further comprise instructions that when executed perform the following: monitoring a platform VR output; identifying the peripheral interface connection state when the platform VR output is monitored; masking the power good signal of the platform VR when the peripheral interface connection state is identified as disconnected; and using an updated minimum system voltage of the device when the power good signal of the platform VR is masked.

In one example, the non-transitory machine readable storage medium can further comprise instructions that when executed perform the following: identifying a first time period when the peripheral interface connection state is monitored.

In one example, the non-transitory machine readable storage medium can further comprise instructions that when executed perform the following: identifying a second time period when the peripheral interface connection state is not monitored.

In one example, the non-transitory machine readable storage medium can further comprise instructions that when executed perform the following: identifying a state of charge of a battery in the device; identifying a threshold for the state of charge; and determining whether the state of charge of the battery in the device is less than the threshold for the state of charge.

In one example, the platform VR can be a 5 volt (V) VR.

While the forgoing examples are illustrative of the principles of technology embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. An apparatus comprising:
   a peripheral interface; and
   one or more processors coupled to the peripheral interface, wherein the one or more processors are to identify whether a connection state of the peripheral interface is one of a connected state or a disconnected state, and to determine whether to extend a performance level based on the connection state.

2. The apparatus of claim 1, further comprising a voltage regulator coupled to the peripheral interface.

3. The apparatus of claim 2, further comprising a switch to mask a power good signal from the voltage regulator to the one or more processors when the connection state is identified to be the disconnected state.

4. The apparatus of claim 3, wherein the switch is a first switch, wherein the apparatus comprises a second switch coupled to the voltage regulator to enable the voltage regulator.

5. The apparatus of claim 2, wherein the one or more processors are to turn off the voltage regulator based on the identification that the connection state is a disconnected state.

6. The apparatus of claim 1, wherein the one or more processors are to receive a signal from the peripheral interface indicative of the connection state when a system voltage is lower than a minimum system voltage.

7. The apparatus of claim 3, wherein the one or more processors are to activate a delay before masking the power good signal.

8. The apparatus of claim 3, wherein the one or more processors are to activate a delay before unmasking the power good signal.

9. The apparatus of claim 1, wherein the peripheral interface is to connect to a peripheral device.

10. The apparatus of claim 1, wherein the peripheral interface is one or more of an audio amplifier port, a high-definition multimedia interface port, or a universal serial bus port.

11. A non-transitory machine-readable storage media having machine-readable instructions stored thereon that when executed cause one or more machines to perform a method comprising:
identifying whether a connection state of a peripheral interface is one of a connected state or a disconnected state; and
determining whether to extend a performance level of one or more processors based on the connection state, wherein the one or more processors are coupled to the peripheral interface.

12. The non-transitory machine-readable storage media of claim 11, having machine-readable instructions stored thereon that when executed cause the one or more machines to perform the method comprising:
masking a power good signal from a voltage regulator to the one or more processors when the connection state is identified to be the disconnected state.

13. The non-transitory machine-readable storage media of claim 12, having machine-readable instructions stored thereon that when executed cause the one or more machines to perform the method comprising:
turning off the voltage regulator based on the identification that the connection state is a disconnected state.

14. The non-transitory machine-readable storage media of claim 11, having machine-readable instructions stored thereon that when executed cause the one or more machines to perform the method comprising:
receiving a signal from the peripheral interface indicative of the connection state when a system voltage is lower than a minimum system voltage.

15. The non-transitory machine-readable storage media of claim 11, wherein the peripheral interface is one or more of an audio amplifier port, a high-definition multimedia interface port, or a universal serial bus port.

16. A system comprising:
a memory;
a platform voltage regulator;
a power management logic;
a peripheral interface;
one or more processors coupled to the memory, the platform voltage regulator, the power management logic, and the peripheral interface; and
a wireless interface to allow the one or more processors to communicate with another device, wherein the one or more processors to identify whether a connection state of the peripheral interface is one of a connected state or a disconnected state, and to determine whether to extend a performance level based on the connection state.

17. The system of claim 16, further comprising a switch to mask a power good signal from the platform voltage regulator to the one or more processors when the connection state is identified to be the disconnected state.

18. The system of claim 17, wherein the switch is a first switch, wherein the system comprises a second switch coupled to the voltage regulator to enable the voltage regulator.

19. The system of claim 16, wherein the one or more processors are to turn off the platform voltage regulator based on the identification that the connection state is a disconnected state.

20. The system of claim 16, wherein the one or more processors are to receive a signal from the peripheral interface indicative of the connection state when a system voltage is lower than a minimum system voltage.

* * * * *